United States Patent
Grill et al.

(10) Patent No.: US 9,196,099 B2
(45) Date of Patent: Nov. 24, 2015

(54) TACHOGRAPH, TOLL ONBOARD UNIT, DISPLAY INSTRUMENT, AND SYSTEM

(75) Inventors: Thomas Grill, Villingen-Schwenningen (DE); Erwin Hess, Ottobrunn (DE); Raphael Lo Conte, Singer (DE); Gerhard Rombach, Triberg (DE)

(73) Assignee: Continental Automotive GmbH, Hannover (DE)

( * ) Notice: Subject to any disclaimer, the term of this patent is extended or adjusted under 35 U.S.C. 154(b) by 786 days.

(21) Appl. No.: 12/680,719

(22) PCT Filed: Sep. 25, 2008

(86) PCT No.: PCT/EP2008/062842
§ 371 (c)(1),
(2), (4) Date: Jun. 14, 2010

(87) PCT Pub. No.: WO2009/043794
PCT Pub. Date: Apr. 9, 2009

(65) Prior Publication Data
US 2010/0250053 A1   Sep. 30, 2010

(30) Foreign Application Priority Data

Sep. 28, 2007  (DE) .................. 10 2007 046 968
Nov. 30, 2007  (DE) .................. 10 2007 058 163

(51) Int. Cl.
*G07C 5/08* (2006.01)
*H04L 12/40* (2006.01)
*H04L 29/06* (2006.01)

(52) U.S. Cl.
CPC ............. *G07C 5/085* (2013.01); *H04L 12/40* (2013.01); *H04L 63/0428* (2013.01); *H04L 2012/40215* (2013.01); *H04L 2012/40234* (2013.01); *H04L 2012/40273* (2013.01)

(58) Field of Classification Search
CPC .... G07C 5/085; H04L 12/40; H04L 63/0428; H04L 2012/40215; H04L 2012/40234; H04L 2012/40273
See application file for complete search history.

(56) References Cited

U.S. PATENT DOCUMENTS

| 4,804,937 A | 2/1989 | Barbiaux et al. |
| 5,877,697 A | 3/1999 | Paas et al. |

(Continued)

FOREIGN PATENT DOCUMENTS

| DE | 195 16 061 A1 | 11/1996 |
| DE | 197 45 962 A1 | 4/1999 |

(Continued)

OTHER PUBLICATIONS

Marko Wolf, et al. "Secure In-Vehicle Communication", Horst Gortz Institute (HGI) for IT Security Ruhr University of Bochum, Germany. Mar. 2006. pp. 95-109.*

(Continued)

*Primary Examiner* — Ryan Zeender
*Assistant Examiner* — H Rojas
(74) *Attorney, Agent, or Firm* — Cozen O'Connor

(57) ABSTRACT

A tachograph and a toll onboard unit as communication partners, which each have a data interface for a data communication via a vehicle data bus to which the communication partners are coupled. The tachograph and/or the toll onboard unit are implemented as a transmitter of data to ascertain a cryptographic check value as a function of user data, which are to be transmitted to the communication partner, and to transmit the cryptographic check value in addition to the user data to the communication partner. The toll onboard unit or the tachograph, respectively, as a receiver of data, is implemented to receive user data and the cryptographic check value associated with the user data from the communication partner and to check the received user data for corruption as a function of the received cryptographic check value.

23 Claims, 3 Drawing Sheets

(56) References Cited

U.S. PATENT DOCUMENTS

| | | | |
|---|---|---|---|
| 5,987,129 | A | 11/1999 | Baba |
| 6,141,609 | A | 10/2000 | Herdeg et al. |
| 6,823,457 | B1 | 11/2004 | Berstis et al. |
| 7,206,672 | B2 | 4/2007 | Mueller |
| 7,323,986 | B2 | 1/2008 | Hunter et al. |
| 2005/0091501 | A1* | 4/2005 | Osthoff et al. ............ 713/181 |
| 2005/0251604 | A1 | 11/2005 | Gerig |
| 2008/0059701 | A1 | 3/2008 | Esfandabadi |
| 2008/0251577 | A1 | 10/2008 | Kimmich et al. |

FOREIGN PATENT DOCUMENTS

| | | |
|---|---|---|
| DE | 199 55 545 A1 | 5/2001 |
| DE | 103 47 836 A1 | 5/2005 |
| DE | 10 2004 008 834 A1 | 8/2005 |
| DE | 10 2005 013 144 A1 | 9/2006 |
| DE | 10 2005 018 138 A1 | 11/2006 |
| EP | 0 292 811 A2 | 11/1988 |
| EP | 0 741 373 B1 | 3/2003 |
| EP | 1 538 572 A2 | 6/2005 |
| EP | 1 630 747 A2 | 3/2006 |
| EP | 1 717 777 B1 | 12/2011 |
| RU | 98117712 A | 9/1998 |
| RU | 2 136 047 | 8/1999 |
| RU | 2 221 277 | 1/2004 |
| WO | WO 97/31448 | 8/1997 |
| WO | WO 2006/000507 | 1/2006 |
| WO | WO 2006/028665 A1 | 3/2006 |
| WO | WO 2006/053998 A1 | 5/2006 |
| WO | WO 2007/031406 | 3/2007 |

OTHER PUBLICATIONS

Kerstin Lemke, Andre Weimerskirch and Christof Paar: "Embedded Security in Cars—Securing Current and Future Automotive IT Applications—Part II: "Secure In-Vehicle communication"" [Online]; Mar. 28, 2006, Springer Berlin Heidelberg, XP 002509799, ISBN: 978-3-540-28428-4 Gefunden (found) im Internet: URL:http://www.springerlink.com/content/x8q6260026m8676m/> [gefunden (found) am Jan. 8, 2009]; Seiten pp. 95-109.

Christof Paar and André Weimerskirch: "Embedded security in a pervasive world" Information Security Technical Report, vol. 12, Issue 3, [Online]; Jan. 2007, Seiten pp. 155-161, XP 002509797; Elsevier Advanced Technology Publications, Oxford (UK); Gefunden (found) im Internet: URL:http://portal.acm.org/citation.cfm?id=1298890> [gefunden (found) am Jan. 12, 2009]; Seite p. 157, Absatz (pass.) 3.3; Seite p. 159, Absatz (pass.) 5.1—Seite p. 160, Absatz (pass.) 5.1.

National Institute of Standards and Technology—Information Technology Laboratory: "The Keyed-Hash Message Authentication Code (HMAC)", Federal Information Processing Standards Publication—FIPS Pub 198; [Online]; Mar. 6, 2002; XP 002509798; Gaithersburg, MD (USA); gefunden (found) im Internet: URL:http://csrc.nist.gov/publications/fips/fips198/fips-198a.pdf>; [gefunden (found) am Jan. 12, 2009]; Seite p. 3, Absatz (pass.) 4.

Kerstin Lemke, Christof Paar: Marko Wolf; Embedded Security in Cars—Securing Current and Future Automotive IT Applications—Part II: "Secure In-Vehicle Communikation"; published in Springer Verlag Berlin Heidelberg; Mar. 28, 2006; mentioned are pp. 95-109; ISBN 978-3-540-28428-4; Please find enclosed cover sheet and pp. 17-123 without pp. 68 and 110.

Kerstin Lemke, Andre Weimerskirch and Christof Paar: "Embedded Security in Cars—Securing Current and Future Automotive IT Applications—Part II: "Secure In-Vehicle communication"" [Online]; Mar. 28, 2006, Springer Berlin Heidelberg, XP 002509799, ISBN: 978-3-540-28428-4 Gefunden (found) im Internet: URL:http://www.springerlink.com/content/x8q6260026m8676m/> [gefunden (found) am Jan. 8, 2009]; Seiten pp. 95-109 (see IDS, dated Mar. 11, 2010 and dated May 31, 2012).

\* cited by examiner

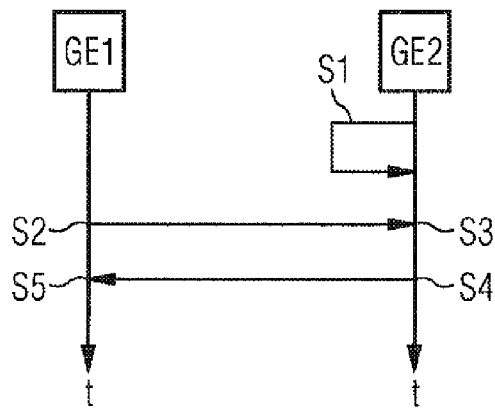
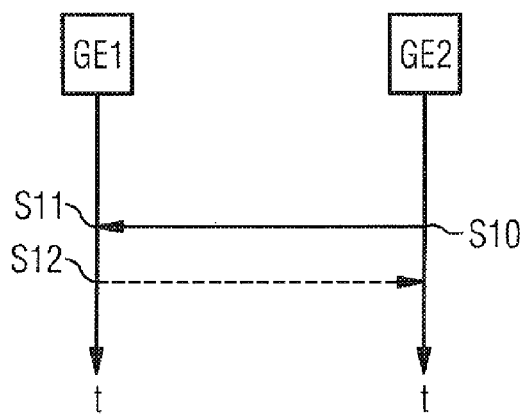
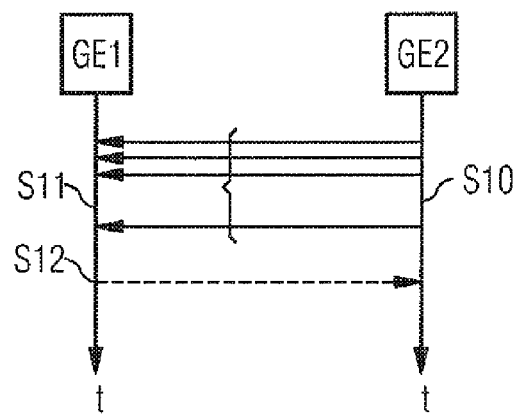
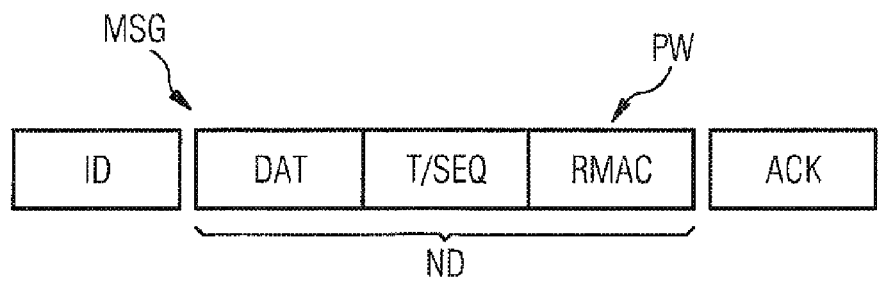

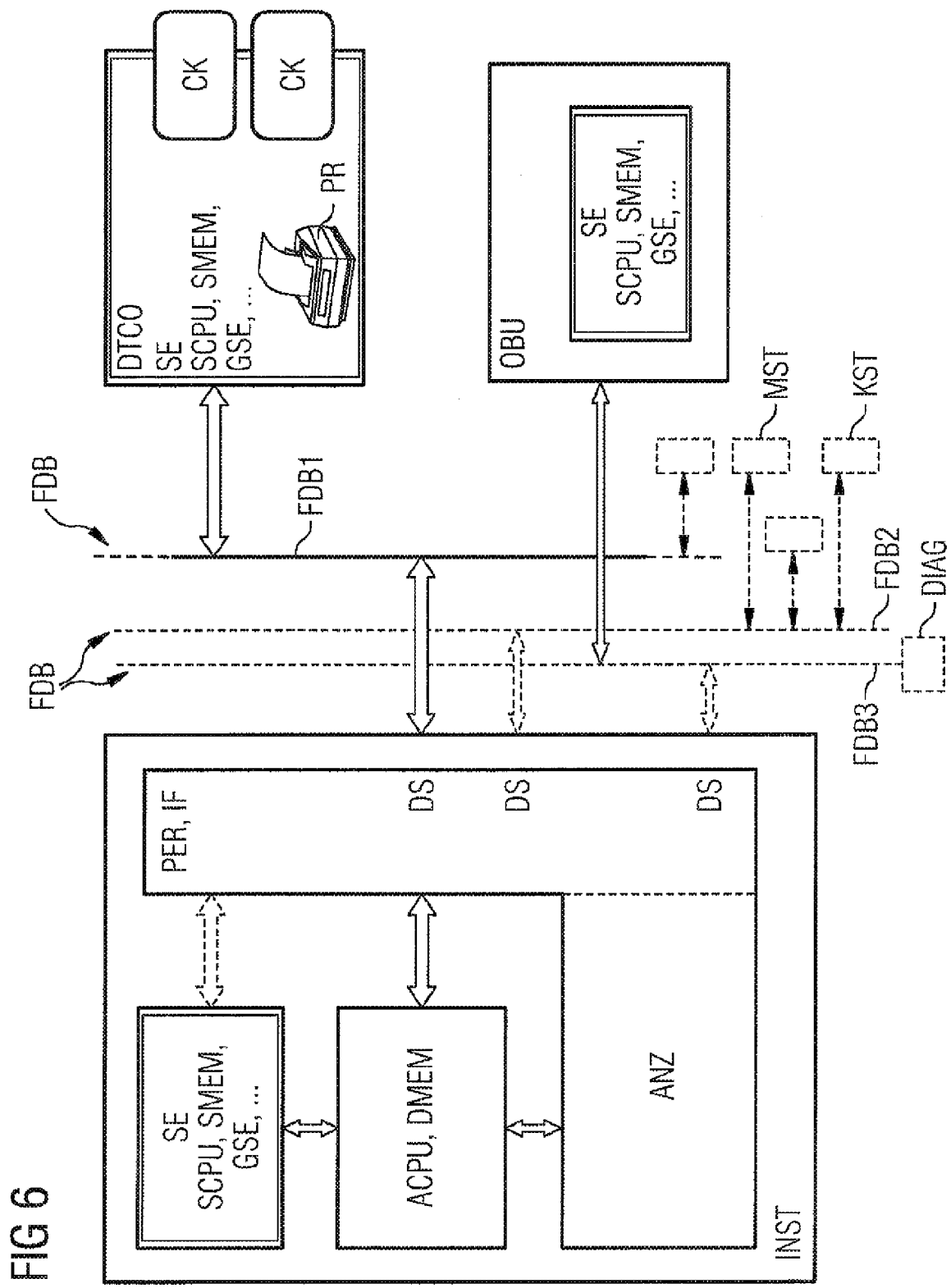

TACHOGRAPH, TOLL ONBOARD UNIT, DISPLAY INSTRUMENT, AND SYSTEM

PRIORITY CLAIM

This is a U.S. national stage of application No. PCT/EP2008/062842, filed on Sep. 25, 2008, which claims priority to the German Application No.: 10 2007 046 968.5, filed: Sep. 28, 2007 and German Application No.: 10 2007 058 163.9, filed: Nov. 30, 2007; the contents of which are incorporated here by reference.

BACKGROUND OF THE INVENTION

1. Field of the Invention

The invention relates to a tachograph, in particular a digital tachograph, a toll onboard unit for detection of road usage fees, a display instrument, and to a system having such items, in particular for motor vehicles.

2. Prior Art

Vehicles are increasingly being equipped with electronic controllers for detection and evaluation of sensor signals, and/or for controlling vehicle functions. Some of these controllers are coupled to one another via a vehicle data bus which, for example, is in the form of a "Controller Area Network", or CAN for short. Controllers transmit messages via this vehicle data bus, which messages can be received and evaluated by other controllers which are connected to this vehicle data bus. Goods vehicles are equipped with a tachograph and, to an increasing extent, with a toll onboard unit. In the future, passenger vehicles may also be required to be equipped with a tachograph and a toll onboard unit.

SUMMARY OF THE INVENTION

An object according to one embodiment of the invention is to provide a tachograph that is reliable. An object according to one embodiment of the invention is to provide a toll onboard unit that is reliable and cost-effective. An object according to one embodiment of the invention is furthermore to provide a display instrument which is reliable. An object according to one embodiment of the invention is furthermore to provide a system which is reliable and cost-effective.

In one embodiment of the invention a system comprises a tachograph and a toll onboard unit as communication partners for data communication. The invention is furthermore distinguished by a corresponding tachograph and by a corresponding toll onboard unit. The tachograph and the toll onboard unit each have a data interface which is in the form of a vehicle data bus interface, such that the data communication takes place via a vehicle data bus, to which the communication partners can be coupled. The tachograph and/or the toll onboard unit, as a transmitter of data, are/is designed to determine a cryptographic check value as a function of payload data, which is intended to be transmitted via the data interface to the respective communication partner, and to transmit the cryptographic check value in addition to the payload data to the respective communication partner. The toll onboard unit and/or the tachograph are/is in the form of a respective data receiver in order to receive payload data and the cryptographic check value associated with the payload data, via the data interface from the respective communication partner, and to check the received payload data for corruptions, as a function of the received cryptographic check value.

The intention is therefore either for only the tachograph to be in the form of a data transmitter and the toll onboard unit a data receiver, or for only the toll onboard unit to be in the form of a data transmitter and the tachograph a data receiver. Alternatively, it is envisaged that the tachograph and the toll onboard unit would each be in the form of data transmitters and receivers.

In particular, the vehicle data bus is a general vehicle data bus which is not intended exclusively for data communication between the tachograph and the toll onboard unit but which is also intended for data communication with other appliance units in the vehicle, that is to say for example controllers that can also be referred to as electronic control units, or ECUs for short. By way of example, the vehicle data bus is in the form of a CAN, a "Local Interconnect Network", or LIN for short, or a "Media Oriented Systems Transport", or MOST for short. By way of example, this allows the general vehicle data bus that is provided in the vehicle to be used for data communication between the tachograph and the toll onboard unit. This is particularly simple and cost-effective, since no separate data link is required. However, it is likewise possible to provide a vehicle data bus separate from the general vehicle data bus, to which the tachograph and the toll onboard unit can be coupled for their data communication.

A cryptographic check value is determined as a function of at least one cryptographic key. Checking of received payload data as a function of the received cryptographic check value is preferably carried out by once again determining the cryptographic check value as a function of the received payload data by the respective receiver, and by comparison of the cryptographic check value determined in this way with the received cryptographic check value. Corruptions can therefore be detected very easily as a discrepancy between the check values.

Data communication can be protected against unauthorized manipulation by provision of the cryptographic check value and by the checking of the received payload data as a function of the cryptographic check value. Since corruptions of the respectively transmitted data can be detected easily at the receiver end as a function of the cryptographic check value, the received data is trustworthy, provided that the check does not reveal any corruptions.

In particular, the data communication protected by the cryptographic check value allows sensor data to be used jointly, thus saving sensors or improving the reliability by redundancy. The system as well as the tachograph and the toll onboard unit can therefore be particularly reliable or cost-effective.

In one embodiment of the invention, the payload data to be transmitted from the tachograph to the toll onboard unit and to be received from the latter comprises speed data and/or route data and/or an up-to-date mileage, which can be detected or determined by the tachograph or by sensors which can be coupled to the tachograph, and/or comprises time data and/or identification data of a driver and/or a company and/or a vehicle.

In particular, the identification data is data which is predetermined for operation of the tachograph, for example by its manufacturer or a workshop, or for example data provided by smart card. By way of example, the smart card is used as a pass for the current driver or the company which is using the vehicle in which the tachograph is arranged. By way of example, the time data is determined precisely and reliably by a real-time clock for the tachograph.

The advantage is that the toll onboard unit does not necessarily require its own sensor for route recording when it receives the speed data and/or route data and/or the current mileage and/or time data from the tachograph, and these items are trustworthy, because of the protection by the cryptographic check value. In particular, the toll onboard unit does not require an inertial sensor, that is to say for example it does not require a gyro sensor. Furthermore, the toll onboard unit can also access trustworthy identification data from the tachograph, such that it possibly does not also require its own devices for detection of identification data. The toll onboard unit can be designed to be particularly cost-effective.

However, the trustworthy data from the tachograph can also be used to improve the reliability, security and/or precision, if the transmitted data from the tachograph and that detected or determined by the toll onboard unit itself, or data detected or determined by sensors coupled thereto are in an essentially redundant form.

In a further embodiment, the payload data to be transmitted from the toll onboard unit to the tachograph comprises time information and/or position information from a position-finding unit. In particular, the position-finding unit is a receiver for receiving position and time information from a satellite-based position-finding system, for example a global positioning system, or GPS for short.

In a further embodiment, the system has a display instrument as a communication partner for data communication. The invention is furthermore distinguished by a corresponding display instrument. The display instrument comprises a data interface which is in the form of the vehicle data bus interface, such that the data communication takes place via the vehicle data bus, to which the display instrument can be coupled. The display instrument is designed to receive payload data and the cryptographic check value associated with the payload data via the data interface from the respective communication partner, and to check the received payload data for corruption, as a function of the received cryptographic check value. The advantage is that data to be displayed can be transmitted to the display instrument in a trustworthy form, that is to say protected by the cryptographic check value against unauthorized manipulation. In particular, data to be displayed from the toll onboard unit and/or the tachograph can be transmitted in such a protected way. This may make it possible to dispense with a dedicated display unit for the respective communication partner, in particular for the tachograph and/or the toll onboard unit. The respective communication partner, in particular the tachograph and/or the toll onboard unit, can thus be designed particularly cost-effectively.

In this context, it is advantageous if the display instrument is designed as a transmitter of data to determine the cryptographic check value as a function of payload data which is intended to be transmitted via the data interface to the respective communication partner, and to transmit the cryptographic check value in addition to the payload data to the respective communication partner. By way of example, the display instrument also has an input unit for manual inputs. The display instrument is then preferably designed to transmit inputs made there, provided with the respective cryptographic check value, securely and reliably to the respective communication partner. This may make it possible to dispense with a dedicated input unit for the respective communication partner, in particular for the tachograph and/or the toll onboard unit. The respective communication partner, in particular the tachograph and/or the toll onboard unit, can thus be designed particularly cost-effectively.

In a further embodiment, the display instrument comprises at least one secure memory for storing at least one cryptographic key and/or the current mileage and/or identification data of the driver and/or company and/or vehicle and/or setting parameters for components in the vehicle and/or diagnosis data relating to the vehicle. These are therefore protected against unauthorized manipulation.

In a further embodiment, the display instrument has at least one housing protective device by which opening of a housing of the display instrument can be identified. This has the advantage that all the components of the display instrument arranged within the housing are therefore protected against manipulation. Any manipulations can be reliably identified by the at least one housing protective device.

The housing protective device preferably comprises a housing switch. The housing switch is arranged such that the opening of the housing can be reliably identified, preferably even when the power supply is switched off. The provision of the housing switch furthermore has the advantage that the opening of the housing can be detected electronically, and countermeasures can therefore be implemented automatically when it has been found that the housing has been opened. By way of example, the countermeasures comprise the display of a warning notification, the cessation or restriction of the operation of the display instrument or of the vehicle, or else deletion of data which is stored, for example, in the secure memory, in order to protect this data against misuse.

In a further embodiment, the display instrument comprises at least two data interfaces which are each in the form of the vehicle data bus interface. The display instrument forms a connecting unit for data communication between communication partners which can be coupled to different ones of the at least two data interfaces. The display instrument is designed to relay and/or check and/or authenticate received payload data and/or to authenticate the communication partners. The data communication between the communication partners can therefore take place particularly securely and reliably.

In this context, it is advantageous if the payload data, which can be checked and/or authenticated by the display instrument, comprises at least some of the software which can be executed, and/or forms software which can be executed. The display instrument can therefore be used to check and/or to authenticate software updates, programs, software functions or software functional modules which, in particular, can be downloaded from outside the vehicle. This makes it possible to achieve particularly high reliability and security. In particular, corrupted software, that is to say for example software which has been transmitted with errors or has been manipulated, can be identified, and installation or use of this software can be prevented.

In this context, it is advantageous for the display instrument to be configured to execute the software that can be executed. In particular, this allows the software installed on the display instrument to be updated, or a functionality of the software which has already previously been installed to be upgraded by the additional installation and additional execution of this software which can be executed. For example, the display capabilities of the display instrument can thus be upgraded, or services can be provided for other appliance units.

In one embodiment, the display instrument is configured to relay the software which can be executed to at least one of the communication partners after successful checking and/or authentication. The software which can be executed can thus be installed and executed in the intended communication partner. In particular, this allows software updates to be carried out securely and reliably on appliance units in the vehicle.

In one embodiment, the display instrument forms a convenience device control unit and/or a diagnosis interface unit and/or an identification unit for identification of a person and/or an access monitoring unit and/or an immobilizer unit, or comprises a part of such a unit. This has the advantage that appliance units can be saved or can be designed more cost-effectively, when their functionality is carried out completely or partially by the display instrument. The system can therefore be particularly cost-effective.

In a further advantageous refinement, each of the communication partners each has at least one secure memory for storage of at least one cryptographic key. At least one of the communication partners is designed to produce at least one cryptographic key and for encrypted transmission of the at least one cryptographic key that is produced to at least one of the respective communication partners. The respective communication partners are designed to receive and decrypt the at least one encrypted cryptographic key, and for secure storage of the at least one cryptographic key in their respective secure memory. Furthermore, the communication partners are designed to determine the cryptographic check value as a function of the at least one cryptographic key.

The at least one cryptographic key preferably comprises a key intended for use in a symmetrical encryption method. The encrypted transmission of the at least one cryptographic key and the decryption of it are preferably carried out by using an asymmetric encryption method. In this case, in particular, the encryption is carried out as a function of a public key of the respective communication partner, and the decryption is carried out as a function of its private key. This allows the at least one cryptographic key to be transmitted particularly securely. The at least one transmitted cryptographic key may, however, likewise comprise a private and/or public key for use with an asymmetric encryption method.

The respective secure memory is preferably a memory which is electrically and/or mechanically protected against unauthorized manipulation, for example in a trusted platform module, or TPM for short, or in a smart card controller.

The cryptographic check value is preferably determined as a function of the at least one cryptographic key using a symmetrical encryption method. Furthermore, the cryptographic check value is preferably determined using a block cipher or a hash function. The cryptographic check value is therefore particularly secure, and can be determined with little computation complexity. This allows the communication partners to be designed cost-effectively. Furthermore this allows real-time-compatible data communication. The communication partner, which is designed for production of the at least one cryptographic key and for encrypted transmission of the at least one cryptographic key that is produced, is, in particular, the tachograph.

In this context, it is advantageous if the communication partners are designed to determine the cryptographic check value as a message authentication code, as a function of the cryptographic key. The message authentication code is also referred to for short as MAC. A code such as this has a high level of security against unauthorized manipulation and can be determined with little computation complexity, and therefore also at low cost. The data communication using the cryptographic check value may therefore be real-time-compatible.

Alternatively or additionally, the communication partners are designed to determine the cryptographic check value as a shortened message authentication code, as a function of the cryptographic key. The shortened message authentication code can also be referred to as truncated MAC or retail MAC. The advantage is that this allows only a small number of data items to be transmitted in addition to the payload data, for the cryptographic check value. The bus load is therefore low, and the requirements for bandwidth of the transmission medium are accordingly also low. A shortened message authentication code such as this has a high level of security against unauthorized manipulation and can be determined with little computation complexity, and therefore also at low cost. Data communication using the cryptographic check value can therefore be real-time-compatible.

In one embodiment, the communication partners are designed to transmit the cryptographic check value in each case together with the associated payload data in one message. The transmission medium, in particular the vehicle data bus, is therefore not additionally loaded, or is additionally loaded only to a minor extent. The bandwidth requirements of the transmission medium are therefore no higher than unsecured transmission of the payload data.

In one embodiment, the communication partners are designed to transmit the cryptographic check value and the associated payload data separately from one another, in at least one message in each case. This has the advantage that the configuration of the messages used to transmit the payload data need not be modified in order to make it possible to take account of the check value. This is particularly advantageous when predetermined message structures, for example SAE J1939, are used.

In one embodiment, in each case at least one of the communication partners in respectively provided data communication is designed to authenticate itself with its respective at least one communication partner. The authentication is preferably carried out before or in conjunction with the transmission of the at least one cryptographic key. The advantage is that the data communication can be restricted by the authentication to trustworthy communication partners. This allows the data communication to be carried out particularly securely.

In one embodiment, the toll onboard unit and the display instrument, which may be provided, are designed to authenticate themselves with the tachograph. The toll onboard unit and the display instrument, which may be provided, are also designed to allow trustworthy data communication between the tachograph on the one hand and the toll onboard unit or the display instrument, which may be provided, on the other hand, and/or to allow trustworthy data communication between the toll onboard unit and the display instrument, which may be provided, in the event of successful authentication, and otherwise to prevent trustworthy data communication based on the check of the received payload data, as a function of the associated received cryptographic check value. The tachograph therefore forms a type of central authentication point which controls and monitors the trustworthy data communication. For example, this also allows the tachograph to be designed to produce the cryptographic key and to distribute the key to the other appliance units once they have successfully authenticated themselves with the tachograph. The other appliance units then need not necessarily be designed to produce the at least one cryptographic key, and can thus be designed cost-effectively. The authentication is preferably carried out before or in conjunction with the transmission of the at least one cryptographic key. The advantage is that the data communication can be restricted by the authentication to trustworthy appliance units as communication partners. The data communication can therefore be carried out particularly securely.

In one embodiment, at least one of the communication partners is designed to automatically once again carry out the production and the transmission of the at least one cryptographic key and the possibly provided authentication as a function of the occurrence of at least one predetermined event. Such a predetermined event is, for example, initialization of the system or of at least one of the communication partners, the passing of a predetermined time interval, for example of one day or of a calibration interval, completion of an action on the system or on at least one of the communication partners, for example because of maintenance tasks, repair or replacement of at least one of the communication partners, or activation of the ignition, for example by turning the ignition key. This makes it possible to achieve a particularly high security level. In particular, this at least one communication partner is the tachograph.

In one embodiment, at least one of the communication partners has an interface to an external unit. This at least one communication partner is designed to determine the cryptographic check value as a function of payload data which is intended to be transmitted to the external unit, as a communication partner, via the interface to the external unit, and to transmit the cryptographic check value in addition to the payload data to this communication partner. The at least one communication partner with the interface to the external unit is additionally or alternatively designed to receive payload data and the cryptographic check value, associated with the payload data, from the external unit via the interface to the external unit, and to check the received payload data for corruptions, as a function of the received cryptographic check value. This also allows the at least one external unit to carry out trustworthy data communication corresponding to that via the vehicle-internal vehicle data bus. The authentication and the transmission of at least one cryptographic key are preferably also correspondingly provided with respect to the data communication between the appliance unit in the vehicle, which has the interface to the external unit, and the respective external unit. The data communication to or from the respective external unit can be provided in a wire-based form, or in a wire-free manner. The at least one external unit is, for example, an external appliance, for example for carrying out maintenance tasks and/or measurements and/or diagnoses and/or for downloading software updates or configuration data. The external unit may, however, likewise be in the form of an external transmitter/receiver or a radio beacon, for example an active road sign which, for example, is preferably erected in the vicinity of a road, for example in order to transmit speed requirements, for example advisory speeds or warnings, for example relating to a maximum permissible vehicle weight or a maximum permissible vehicle height. It is also possible to provide, for example, for identification data to be transmitted to the at least one external unit, for example relating to the vehicle or the driver.

In one embodiment, at least one of the communication partners is designed to encrypt the payload data to be transmitted, and at least one other of the communication partners is designed to decrypt the received encrypted payload data. In this case, the encryption and decryption are carried out as a function of at least one of the cryptographic keys. The advantage is that this also allows confidential data communication. A symmetrical or an asymmetric encryption method can be provided for encryption and decryption.

In one embodiment, the system comprises a traffic telematics unit and/or an engine control unit for controlling an internal combustion engine or at least one electric motor, which is provided for propulsion of a vehicle, and/or a convenience device control unit and/or a diagnosis interface unit and/or an identification unit for identification of a person and/or an access monitoring unit as communication partner for data communication, which in each case comprise a data interface which is in the form of the vehicle data bus interface, such that the data communication takes place via the vehicle data bus, to which the traffic telematics unit, the engine control unit, the convenience device control unit, the diagnosis interface unit, the identification unit and/or the access monitoring unit can be coupled. In particular, a speed governor can also be provided, which is preferably formed together with the engine control unit or is comprised by it, and which preferably presets a speed of travel for the vehicle automatically as a function of the respectively applicable speed limits, which have been transmitted, for example, from the at least one external unit, for example from the active road sign.

The traffic telematics unit, the engine control unit, the convenience device control unit, the diagnosis interface unit, the identification unit and the access monitoring unit are preferably in the form of data communication partners, as a transmitter of data and/or as a receiver of data. As transmitters of data, these are each designed to determine a cryptographic check value as a function of payload data, which is intended to be transmitted via the data interface to the respective communication partner, and to transmit the cryptographic check value in addition to the payload data to the respective communication partner. As receivers of data, these are designed to receive payload data and the cryptographic check value associated with the payload data, via the data interface from the respective communication partner, and to check the received payload data for corruptions, as a function of the received cryptographic check value. The advantage is that the tachograph and the toll onboard unit, and the display instrument which may be provided, can be operated together with the other said appliance units on the same vehicle data bus. Data communication protected by a cryptographic check value and insecure data communication can take place jointly via the same vehicle data bus. However, said appliance units are preferably likewise in the form of communication partners for secure data communication. The advantage is that this also allows data communication with or between these communication partners, protected against unauthorized manipulation, and therefore in a trustworthy form. This secure data communication allows said communication partners to be designed to be more cost-effective if required, since detection or determination components, for example sensors, can be used jointly. Furthermore, said communication partners can be more reliable and/or more precise since, if required, redundant data can essentially be used from two or more than two appliance units.

BRIEF DESCRIPTION OF DRAWINGS

Exemplary embodiments of the invention will be explained in more detail with reference to the schematic drawings, in which:

FIG. 3 is a flowchart of an authentication process;

FIG. 4A is a flowchart of a first embodiment of a data transmission process;

FIG. 4B is a flowchart of a second embodiment of the data transmission process;

FIG. 5 is a message layout; and

FIG. 6 is the system with the display instrument.

Elements having the same design or function are provided with the same reference symbols in all the figures.

DETAILED DESCRIPTION OF THE DRAWINGS

Figure 1:
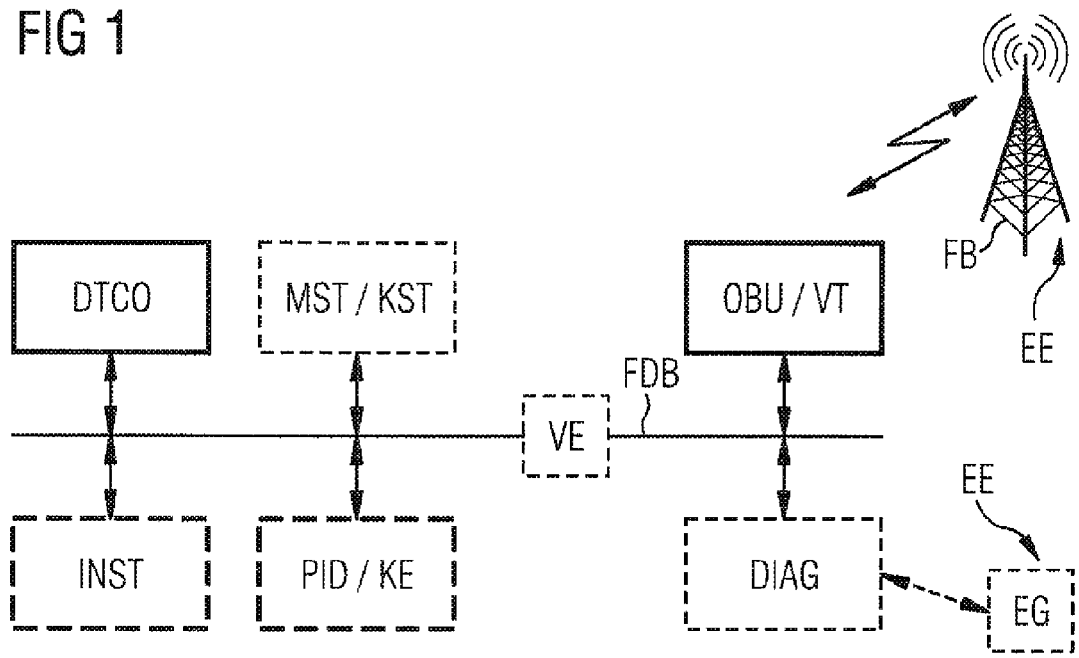
FIG. 1 is a system comprising a tachograph and a toll onboard unit.

A system of FIG. 1 comprises a digital tachograph DTCO and a toll onboard unit OBU as appliance units, which are coupled to one another via at least one vehicle data bus FDB (FIG. 1). In particular, the at least one vehicle data bus FDB is in the form of a data bus corresponding to a "Controller Area Network", or CAN for short, or some other data bus for motor vehicles, for example a "Local Internet Network" or LIN for short, or a "Media Oriented Systems Transport", or MOST for short. The at least one vehicle data bus FDB is preferably available in a general form to the appliance units in the motor vehicle for their data communication, that is to say the vehicle data bus FDB is preferably not specifically and exclusively designed and provided for data communication between the tachograph DTCO and the toll onboard unit OBU. A general vehicle data bus FDB such as this is in general provided in every motor vehicle, as a result of which the tachograph DTCO and the toll onboard unit OBU just need to be coupled to it in order to allow data communication between these appliance units.

However, it is also possible to provide two or more than two vehicle data buses FDB in the motor vehicle. The tachograph DTCO and the toll onboard unit OBU are then, for example, coupled to only one of the vehicle data buses FDB in the motor vehicle. However, they may also be coupled to two or more than two vehicle data buses FDB. In particular, it may be advantageous for the tachograph DTCO to be coupled to at least two of the vehicle data buses FDB. On the basis of the authority of the vehicle manufacturer, it is possible that no appliance units from other manufacturers may be allowed to be connected thereto via at least one of the vehicle data buses FDB. For example, the toll onboard unit OBU may possibly not be allowed to be coupled to one of the vehicle data buses FDB which is subject to the authority of the vehicle manufacturer. The appliance units from other manufacturers, and in particular the toll onboard unit OBU would therefore possibly need to be connected to an additionally provided vehicle data bus FDB. However, the tachograph DTCO must if appropriate then be connected to two or more than two vehicle data buses FDB in order not only to allow communication with appliance units which are subject to the authority of the vehicle manufacturer, such as an engine control unit MST, but also to allow communication with appliance units which are not subject to the authority of the vehicle manufacturer, such as the toll onboard unit OBU and/or a diagnosis interface unit DIAG.

In addition to the tachograph DTCO and the toll onboard unit OBU, the system may furthermore also have a display instrument INST and/or a traffic telematics unit VT and/or an identification unit PID and/or an access monitoring unit KE and/or the engine control unit MST and/or a convenience device control unit KST and/or an immobilization unit and/or the diagnosis interface unit DIAG as appliance units, and/or else have further appliance units in the motor vehicle which are coupled to the at least one vehicle data bus FDB. The display instrument INST is intended, for example, to display a current speed of the motor vehicle and/or the distance traveled and/or a current mileage, which are transmitted to the display instrument INST for example by the tachograph DTCO via one of the possibly several vehicle data buses FDB. Furthermore, the display instrument may also be intended to display operating time data or other data which is recorded by the tachograph DTCO with reference to the respective driver of the motor vehicle, and/or diagnosis information and/or vehicle-safety-relevant information. The display instrument INST is preferably furthermore intended to display information from the toll onboard unit OBU, for example a number of axles and/or identification data relating to the motor vehicle and/or the driver.

The traffic telematics unit VT is, for example, intended to receive speed presets or other traffic-relevant information from stationary or mobile radio beacons FB, for example active road signs, and/or satellites and/or other vehicles and/or external transmitters/receivers, for example a toll recording system. The radio beacons FB and the external transmitters/receivers may also be referred to as and/or be in the form of "street terminals". It is also possible to provide for information to be sent to other vehicles and/or to the external transmitters/receivers. Furthermore, it is possible to provide the identification data relating to the motor vehicle and/or the driver, and/or the current speed and/or information relating to the distance traveled, which has been recorded or determined by the tachograph DTCO and/or the toll onboard unit OBU, to be sent to the respective external transmitters/receivers, in particular the toll recording system. The external transmitters/receivers are in the form of a mobile radio base station for the "Global System for Mobile Communications", or GSM for short. The external transmitters/receivers may, however, also be of a different design. The traffic telematics unit VT may be in the form of a separate appliance unit or may be formed together with another appliance unit, preferably together with the toll onboard unit OBU.

The identification unit PID and the access monitoring unit KE may, in particular, be intended to identify the driver and to monitor access to the motor vehicle and/or to its functions. The identification process is carried out, for example, as a function of biometric features, as a result of which there may be no need for a mechanical key to gain entry. The access monitoring may therefore also be referred to as "keyless entry". The identification unit PID and the access monitoring unit KE may, however, also be designed differently, for example to identify and allow access as a function of a smart card, a vehicle key or the like with which, for example, communication takes place in a wire-free manner. The identification unit PID and/or the access monitoring unit KE are, for example, part of a motor vehicle door lock system. The identification unit PID and the access monitoring unit KE may also be in the form of a common appliance unit.

The engine control unit MST is intended in particular to control an internal combustion engine in the motor vehicle, and/or to control at least one electric motor in the motor vehicle, which is intended for its propulsion. The engine control unit MST may also be designed to implement the received speed presets by appropriate throttle control of the speed of the vehicle, that is to say to carry out the function of a speed limiter. However, a separate speed governor can likewise be provided, and is coupled to the at least one vehicle data bus FDB.

The convenience device control unit KST is intended, for example, to control convenience devices in the motor vehicle. For example, it may be possible to automatically adjust seat settings or other personal settings, for example relating to the setting of the rear-view or side mirrors, an air-conditioning system or a radio, or other media, depending on the identification data which is recorded or determined by the tachograph DTCO, the toll onboard unit OBU and the identification unit PID.

The diagnosis interface unit DIAG may be intended to allow external appliances EG to be connected for diagnosis and/or maintenance purposes and/or for downloading software updates and/or for carrying out measurements, in particular relating to emissions from the motor vehicle and/or for parameter setting or updating of configurations of the appliance units or of the motor vehicle, for example relating to control of the internal combustion engine. The external appliance EG may be connected by a wire or in a wire-free form.

The vehicle database FDB may also have a connecting unit VE, which may also be referred to as a "gateway" or "interface". A connecting unit VE such as this connects two or more bus elements of the at least one vehicle data bus FDB to one another such that the bus elements form a common data bus for data communication between the respective appliance units coupled to these bus elements. The connecting unit VE may also be designed to translate data communication between the bus elements, for example if the bus elements are based on different physical data bus architectures, or different communication protocols are used on the bus elements. Furthermore, the connecting unit VE can also be designed to filter data communication, for example for permissible and impermissible messages MSG. By way of example, the connecting unit VE forms an interface between that bus element of one of the possibly several vehicle data buses FDB to which the appliance units which are fundamentally provided in every vehicle and which are intended to communicate via the vehicle data bus FDB are coupled, and that bus element of this vehicle data bus FDB to which appliance units which are optionally provided in the vehicle and which are intended to communicate via the vehicle data bus FDB can be coupled. The appliance units which are fundamentally provided in every vehicle are, for example, subject to the monitoring or authority of the vehicle manufacturer, as a result of which the vehicle manufacturer can ensure permissible and reliable data communication between these appliance units. The optionally provided appliance units are, however, in general not subject to the monitoring or authority of the vehicle manufacturer and may also be produced, and introduced into the system by other providers, as a result of which it may be advantageous to filter the data communication between the bus elements of the vehicle data bus FDB. Filtering makes it possible to ensure, for example, that impermissible messages MSG which could endanger the safety and reliability of vehicle operation, are not passed on.

There is a requirement to transmit data in a manner which is protected against unauthorized manipulation and possibly also confidentially from one of the appliance units which are coupled to the at least one vehicle data bus FDB, to another of the appliance units which are coupled to the at least one vehicle data bus FDB. In other words, a trustworthy communication channel, which can also be referred to as a "trusted channel", is required between the appliance units which are coupled to one of the possibly several vehicle data buses FDB, thus allowing data communication between these appliance units, protected against unauthorized manipulation and possibly in a confidential form.

By way of example, in the course of its intended use in the motor vehicle, the tachograph DTCO determines speed data and/or route data and/or the current mileage and/or time data. The toll onboard unit OBU likewise requires data such as this in order to determine a toll to be paid. The toll onboard unit OBU must determine this data itself when it does not receive this in a trustworthy form from the tachograph DTCO. However, this is complex and expensive. Provision is therefore made for the data determined by the tachograph DTCO to be transmitted to the toll onboard unit OBU via one of the possibly several vehicle data buses FDB. To make it possible to identify unauthorized manipulation of the data transmitted from the tachograph DTCO via this vehicle data bus FDB to the toll onboard unit OBU, this data is transmitted protected against unauthorized manipulation, that is to say via the virtual trustworthy communication channel. The data received by the toll onboard unit OBU from the tachograph DTCO is therefore trustworthy, as a result of which the toll onboard unit OBU does not itself need to record speed data, route data, mileage or time. The toll onboard unit OBU can therefore be designed to cost considerably less.

The toll onboard unit OBU can be designed to cost even less and to be even smaller if it uses the display instrument INST as a display, and therefore no longer requires its own display. The toll onboard unit OBU is then designed to send the data to be displayed via the trustworthy channel via the vehicle data bus FDB to the display instrument INST. The display instrument INST is correspondingly designed to receive this data from the toll onboard unit OBU, and to check it for unauthorized manipulation. The data received by the display instrument INST from the toll onboard unit OBU is therefore trustworthy and can be reliably displayed by the display instrument INST.

Furthermore, it is also possible to provide for information data relating to a driver and/or a company and/or the motor vehicle, and/or other identification data to be transmitted via the virtual trustworthy channel from the tachograph DTCO to the toll onboard unit OBU. By way of example, the identification data is recorded by the tachograph DTCO, for example by reading an appropriate smart card, which is used as a digital pass for a driver of the motor vehicle and/or a vehicle keeper.

Figure 2A:
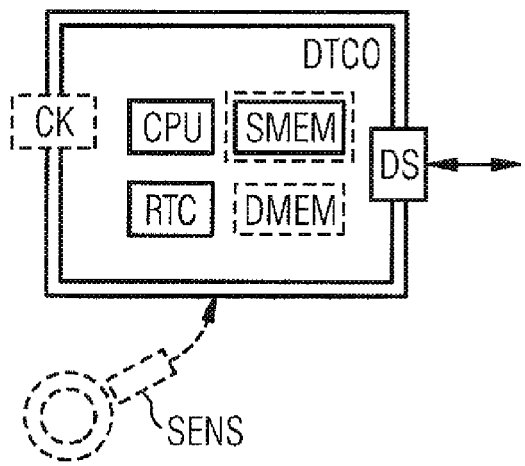
FIG. 2A is the tachograph.

The tachograph DTCO has a secure memory SMEM, a real-time clock RTC, at least one smart card reading unit into which a smart card CK can be inserted, for example a tachograph card or a workshop card, and preferably a data memory DMEM (FIG. 2A). The real-time clock RTC is preferably arranged in a manipulation-proof form in the tachograph DTCO and is designed to produce reliable and secure time stamps T. In particular, the time stamps T can be used for data recording in the tachograph DTCO. The real-time clock RTC can preferably be adjusted only by authorized personnel, who can authenticate themselves to the tachograph DTCO by an appropriate smart card CK, for example by the workshop card. The tachograph DTCO can be coupled to at least one sensor SENS, in particular to a wheel rotation speed sensor, in order to record or determine a current motor vehicle speed, the distance traveled and/or the current mileage.

The tachograph DTCO furthermore has at least one computation unit CPU. The at least one computation unit CPU is intended, for example, to control functions of the tachograph DTCO. Further computation units CPU may also be provided in order to control functions of the tachograph DTCO. The functions of the tachograph DTCO include, in particular, recording or determination of data and manipulation-proof storage of the recorded data. The recorded data includes, for example, journey data, for example the motor vehicle speed, or a change of smart card CK or other data, which is recorded or determined during operation of the tachograph, for example fault messages.

The secure memory SMEM is preferably electrically and/or mechanically protected against manipulation of the data stored in it. For example, the secure memory SMEM is provided with a protective layer or a security grid which can be monitored electrically. In the event of damage to the protective layer or to the security grid, access to the data stored in the secure memory SMEM can for example be prevented, for example by deleting the data. However, the secure memory SMEM may also be designed in a different way.

At least two computation units CPU are preferably provided. One of the at least two computation units CPU forms a secure computation unit SCPU and is intended to execute cryptographic algorithms, for example encryption and/or signature processes, and is for this purpose preferably exclusively coupled to the secure memory SMEM. This computation unit CPU and the secure memory SMEM are preferably formed jointly as one unit or as one module, for example as a "Trusted Platform Module", or TPM for short, or as a smart card controller. The provision of a secure microcontroller such as this with a secure memory SMEM allows the tachograph DTCO to cost particularly little, and to have a high level of security. Another of the at least two computation units CPU is preferably intended to control the general operation of the tachograph. This computation unit CPU, which can also be referred to as an application computation unit ACPU, need not have any security functionality and uses the secure computation unit SCPU for security-relevant tasks or, conversely, the secure computation unit SCPU uses the application computation unit ACPU for non-security-relevant tasks. By way of example, the application computation unit ACPU is intended to carry out data processing in real time, that is to say for example in a time window in the order of magnitude of about one millisecond. However, it is also possible to provide for the secure computation unit SCPU to be designed for recording of sensor data, for example from the sensor SENS, for processing of this data and for storage or preparation of this data independently of the application computation unit ACPU. The secure computation unit SCPU is preferably intended to check the data to be processed by the application computation unit ACPU and/or to check the program code to be executed for unauthorized manipulations or corruptions, for example by determining and checking a digital signature. However, the at least one computation unit CPU may also be designed differently. In particular, the application computation unit ACPU and the secure computation unit SCPU may also be in the form of a common computation unit CPU.

The secure memory SMEM is intended in particular for secure storage of at least one cryptographic key. The secure memory SMEM is preferably provided for secure storage of a plurality of cryptographic keys, in particular of at least one private key for the use of asymmetric encryption and/or signature processes and/or at least one key for the use of symmetrical encryption and/or signature processes.

The tachograph DTCO has a secure and preferably security-certified hardware, which offers a secure environment for data processing and data storage. As a result of the secure memory SMEM, the tachograph DTCO is furthermore suitable for storing cryptographic keys and digital certificates and other data in a secure form. For this purpose, the tachograph DTCO is designed to execute secure and preferably security-certified cryptographic algorithms in order to allow the secure storage of data, by determining and storing a digital signature for the data. For this purpose, the tachograph DTCO has a cryptographic functional unit which is formed by one of the possibly several computation units CPU in the tachograph DTCO, in particular by the secure computation unit SCPU, or is included in it. The cryptographic functional unit or the secure computation unit SCPU is in particular formed by the TPM or the smart card controller, that is to say the secure microcontroller, or is included in it.

The tachograph DTCO preferably has at least one protective device SE. The at least one protective device SE comprises the secure memory SMEM and the cryptographic functional unit or the secure computation unit SCPU. The tachograph DTCO furthermore preferably comprises at least one protective device SE for monitoring at least one operating parameter of the secure memory SMEM and/or of the at least one computation unit CPU, in particular of the cryptographic functional unit or the secure computation unit SCPU, and/or for monitoring their mechanical integrity. The at least one operating parameter comprises an operating voltage and/or an operating temperature and/or a clock frequency. The at least one protective device SE is preferably designed to check whether the at least one operating parameter has undershot a predetermined lower threshold value or has overshot a predetermined upper threshold value, that is to say whether the at least one operating parameter has left a value range which is predetermined by the lower and upper threshold values.

If the security requirements are stringent, the at least one protective device SE preferably also has a protective grid or the like which is in the form of the uppermost metallization layer on a chip of the secure memory SMEM and/or of the at least one computation unit CPU, in particular the cryptographic functional unit or the secure computation unit SCPU. This is indicated in FIG. 2A for the secure memory SMEM by a frame in the form of dashed lines around this component. The at least one protective device SE is designed to identify damage to the protective grid. It is therefore possible to identify infringement of the mechanical integrity of the secure memory SMEM, and/or of the cryptographic functional unit and/or of the secure computation unit SCPU. However, the at least one protective device SE may also be designed differently, and in particular may be matched to the respective security requirements.

The at least one protective device SE preferably also comprises a housing protective device GSE, for example in the form of at least one housing switch. The housing protective device GSE is triggered by opening the housing of the tachograph DTCO. The tachograph DTCO is preferably designed to restrict or cease operation, and possibly to delete security-relevant data, for protection against unauthorized manipulations, for example to delete the cryptographic keys which are stored in the secure memory SMEM. The housing protective device GSE may also be formed by a lid seal and/or a seal on the housing, or may include such a lid seal or seal, such that it is possible to identify whether the housing has been opened.

The data memory DMEM is preferably not secure, that is to say, in particular, it is not electrically and/or mechanically protected against manipulation. Because the price of the secure memory SMEM is generally higher than that of the data memory DMEM, the secure memory SMEM may have only a small memory capacity in comparison to the data memory DMEM. Data stored in the data memory DMEM can be protected against unauthorized manipulation by a digital signature.

The tachograph DTCO furthermore has at least one data interface DS. The tachograph DTCO can be coupled to the at least one vehicle data bus FDP by the at least one data interface DS. The tachograph DTCO preferably has two data interfaces DS. One of these two data interfaces DS is intended for coupling to one of the possibly several vehicle data buses FDB which are subject to the authority of the vehicle manufacturer. The other of the two data interfaces DS is intended for coupling to one of the possibly several vehicle data buses FDB which are not subject to the authority of the vehicle manufacturer, and is intended in particular for coupling to that vehicle data bus FDB which is coupled to the toll onboard unit OBU.

Figure 2B:
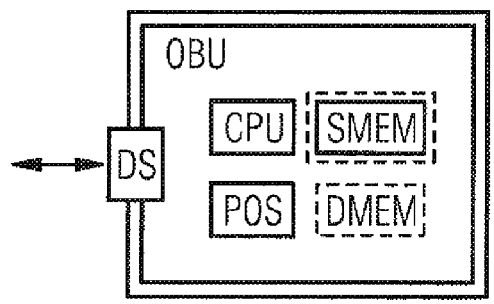
FIG. 2B is the toll onboard unit.

FIG. 2B shows the toll onboard unit OBU, which likewise comprises the at least one computation unit CPU, the secure memory SMEM and the at least one data interface DS, which each correspond essentially to the corresponding components of the tachograph DTCO.

Furthermore, the data memory DMEM may also be provided in a corresponding manner. The toll onboard unit OBU preferably also has protective devices SE corresponding to those for the tachograph DTCO. The toll onboard unit OBU is designed to record, to determine and possibly to store the variables which are required to determine road usage charges that have to be paid.

The toll onboard unit OBU can also have a position-finding unit POS for determining a current position of the motor vehicle. The position-finding unit POS is for this purpose designed to receive and to evaluate data from a satellite-based position-finding system a "Global Positioning System", or GPS for short. Alternatively or additionally, the position-finding unit POS may also have an inertial sensor, in particular a gyro sensor. The position-finding unit POS can be partially or completely dispensed with if the required information is transmitted to the toll onboard unit OBU via the trustworthy communication channel, via the vehicle data bus FDB from the tachograph DTCO. However, it is likewise possible to provide for the precision or reliability of the toll onboard unit OBU and/or of the tachograph DTCO to be increased by redundancy of the data which is recorded or determined by the tachograph DTCO and of the data which is recorded or determined by the toll onboard unit OBU, and in particular by its position-finding unit POS. For example, it is possible to transmit data determined by the position-finding unit POS, preferably via the virtual trustworthy communication channel, via the vehicle data bus FDB to the tachograph DTCO. The tachograph DTCO may be designed to evaluate and/or to store this data. Discrepancies between the recorded or determined data of the tachograph DTCO and of the toll onboard unit OBU can thus easily be identified, thus making it possible to increase the security and reliability of the system.

Figure 2C:
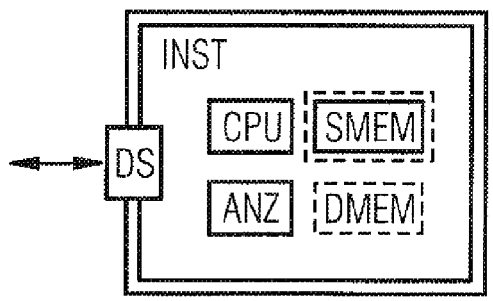
FIG. 2C is a display instrument.

FIG. 2C shows the display instrument INST, which likewise comprises the at least one computation unit CPU, the secure memory SMEM and the at least one data interface DS, which each essentially correspond to the corresponding components of the tachograph DTCO or of the toll onboard unit OBU. The display instrument INST may also have protective devices SE corresponding to those of the tachograph DTCO or of the toll onboard unit OBU. However, in general, the security requirements for the display instrument INST are less stringent than those for the tachograph DTCO or the toll onboard unit OBU. Furthermore, the data memory DMEM can also be provided in a corresponding manner, for example for temporary storage of data to be displayed.

The display instrument INST furthermore has at least one display unit ANZ for displaying information items which are transmitted to the display instrument INST from the tachograph DTCO and/or from the toll onboard unit OBU and/or from other appliance units which are coupled to the same vehicle data bus FDB, via the vehicle data bus FDB and in particular via the trustworthy channel.

The display instrument INST may also have at least one input unit for inputting and/or selecting data. For example switches and/or knobs and/or buttons and/or other input devices are provided for manual inputting or manual selection. The display instrument INST is preferably designed to transmit the operated inputs or selections via the trustworthy channel via the vehicle data bus FDB to the respectively provided appliance unit to the tachograph DTCO or to the toll onboard unit OBU. The respective appliance unit may then not need to have its own input unit, and can thus be designed to cost less and to be smaller. Furthermore, the respective appliance unit then need not be arranged in an easily accessible form in the vehicle. The capability for secure data storage in the secure memory SMEM and/or for trustworthy and/or confidential data transmission to other appliance units that the display instrument INST with the input unit is also suitable, for example, for detection of access or release codes or the like, for example in the form of secret numbers or personal identification numbers, or PIN for short, and for manipulation-proof transmission of such codes to at least one of the appliance units.

The identification unit PID and/or the access monitoring unit ICE and/or the traffic telematic unit VT and/or the engine control unit MST and/or the convenience device control unit KST and/or the diagnosis interface unit DIAG preferably likewise also have the at least one computation unit CPU, the secure memory SMEM and the at least one data interface DS, which each correspond essentially to the corresponding components of the tachograph DTCO, of the toll onboard unit OBU and of the display instrument INST. Furthermore, these said appliance units are preferably also designed to transmit and/or to receive data via the virtual trustworthy channel and to check the received data for unauthorized manipulation, that is to say corruption. The data communication between the appliance units can thus be carried out particularly securely and reliably, and the transmitted data is therefore particularly trustworthy.

The protection of the transmitted data, in particular of payload data DAT, and therefore also of the virtual trustworthy channel, against unauthorized manipulation is based on a cryptographic check value PW, which is in each case determined as a function of the payload data DAT and is transmitted in addition to the payload data DAT. The cryptographic check value PW is determined by the respective appliance unit for example as a digital signature or as a message authentication code, which can also be referred to as an MAC for short. The cryptographic check value PW is, in particular, determined as a shortened message authentication code RMAC, which can also be referred to as "truncated MAC" or "retail MAC". The message authentication code and, correspondingly, the shortened message authentication code RMAC are preferably determined as a function of the at least one cryptographic key which is stored in the secure memory SMEM, in particular the cryptographic key provided for symmetrical encryption processes, preferably by using a "Cipher Block Chaining Mode", or CBC for short, and an algorithm in accordance with the "Data Encryption Standard", or DES for short, or "Advanced Encryption Standard", or AES for short. The cryptographic check value PW and in particular the message authentication code or the shortened message authentication code RMAC may, however, also be formed differently.

By way of example, the method authentication code has a length of eight bytes. The shortened message authentication code RMAC preferably comprises a portion of the message authentication code that comprises four bytes or two bytes. The shortened message authentication code RMAC may, however, also have a different length and/or may be formed differently, but the shortened message authentication code RMAC has a shorter length than the unshortened message authentication code.

Each of the data receivers can check the payload data DAT as a function of the received cryptographic check value PW associated with the payload data DAT and as a function of a suitable cryptographic key, for corruptions. The suitable cryptographic key is that cryptographic key which the sender of the data used to determine the cryptographic test value PW as a function of the payload data DAT when the cryptographic check value PW was determined using a symmetrical method, that is to say for example as a message authentication code or the shortened message authentication code RMAC. For this purpose, the data receiver must have the same cryptographic key as the data sender. The suitable cryptographic key may, however, also be a public key associated with the private key of the data sender, if the cryptographic check value PW was determined using an asymmetric method as the digital signature. The data receiver need then know only the public key of the sender of the data, but not the sender's private key. The asymmetric method allows particularly high security, but in general requires more computation effort than the symmetrical method. The symmetrical method is therefore used by preference to determine the cryptographic check value PW.

FIG. 3 shows an authentication process which is preferably carried out as a function of at least one predetermined event. One such predetermined event is the start of operation, initialization of the system or of at least one of the communication partners, a predetermined time interval having elapsed, for example a day or a calibration interval, completion of an action on the system or on at least one of the communication partners, for example because of maintenance tasks or repair or replacement of at least one of the communication partners, or activation of the ignition by turning the ignition key. In the authentication process, at least one cryptographic key is preferably used for determining the cryptographic check value PW and for checking payload data DAT as a function of the cryptographic check value PW.

A first appliance unit GE1 and a second appliance unit GE2 are provided as appliance units and communication partners. By way of example, the first appliance unit GE1 is formed by the toll onboard unit OBU, and the second appliance unit GE2 is formed by the tachograph DTCO. The first appliance unit GE1 may, however, likewise be formed by the display instrument INST, and the second appliance unit GE2 may be formed by the toll onboard unit OBU or the tachograph DTCO. Furthermore, these associations may also be formed in the opposite manner. The first appliance unit GE1 and/or the second appliance unit GE2 may, however, each also be formed by a different appliance unit coupled to the same vehicle data bus FDB.

The first and the second appliance units GE1, GE2 preferably already have the respective public key of the respective communication partner. If this is not the case, the first and the second appliance units GE1, GE2 must transmit their respective public keys to the respective communication partner.

In a step S1, the second appliance unit GE2 carries out a check of its internal states and of the sensors SENS which may be connected. The step S1 is preferably carried out at the start of operation. In a step S2, the first appliance unit GE1 sends an authentication request to the second appliance unit GE2. The first appliance unit GE1 sends the authentication request but preferably in encrypted form and as a function of the public key of the second appliance unit GE2, to the latter, in such a way that only the second appliance unit GE2 can decrypt the authentication request with its private key. The authentication request preferably includes identification information relating to the first appliance unit GE1 and/or a clock time and/or a date and/or a sequence value. In a step S3, the second appliance unit GE2 receives the authentication request and encrypts this as a function of its private key. In a step S4, the second appliance unit GE2 sends an authentication response to the first appliance unit GE1. The second appliance unit GE2 sends the authentication response, preferably in encrypted form, as a function of the public key of the first appliance unit GE1 to the latter, in such a way that only the first appliance unit GE1 can decrypt the authentication response with its private key. The authentication response preferably comprises a certificate which comprises the cryptographic key for the symmetrical method and identification information relating to the second appliance unit GE2. Furthermore, the authentication response preferably also comprises a sequence value and/or a clock time and/or a date and/or a random value, in order to make unauthorized replacement or suppression of the authentication response more difficult. In a step S5, the first appliance unit GE1 receives the authentication response and decrypts this as a function of its private key. The first appliance unit GE1 stores the received cryptographic key in its secure memory SMEM.

It is possible to provide for the respective communication partners which are transmitting messages MSG to one another corresponding to the virtual trustworthy channel to authenticate one another, preferably by one of the communication partners sending the authentication request to its respective communication partner. Decentralized authentication of the appliance units such as this allows high flexibility. However, a central authentication point can likewise be provided, and is preferably formed by the tachograph DTCO. The appliance units are then designed to preferably authenticate themselves with this central authentication point using the authentication process illustrated in FIG. 3. The central authentication point is designed to produce the respective at least one cryptographic key and to monitor and/or control the data communication between the appliance units with regard to the virtual trustworthy channel. By way of example, when the central authentication point confirms the trustworthiness of one of the appliance units, other appliance units can trust the payload data DAT which they receive from the appliance unit that has been classified as being trustworthy together with the associated cryptographic check value PW, provided that the check of the payload data DAT as a function of the received check value PW does not result in any indication of corruption. Correspondingly, the central authentication point can also confirm that one of the appliance units is not trustworthy. Other appliance units can then not trust the payload data DAT from this appliance unit which is not trustworthy even if the check of the payload data DAT as a function of the received check value PW does not provide any indication of corruption. By way of example an appropriate request to the central authentication point, the appliance units can check whether that appliance unit from which they wish to receive and evaluate payload data DAT is trustworthy. This request to the central authentication point, and its response, preferably likewise take place via the virtual trustworthy channel.

FIG. 4A shows a flow chart of a first embodiment of a secure data transmission process between the second and the first appliance units GE2, GE1, that is to say a data transmission process via the virtual trustworthy channel. In a step S10, the second appliance unit GE2 forms the message MSG which is to be transmitted and comprises the payload data DAT and the cryptographic check value PW. By way of example, FIG. 5 illustrates one such message MSG. The payload data DAT and the cryptographic check value PW, preferably in the form of the shortened message authentication code RMAC, are contained jointly in the message MSG.

No additional message MSG is therefore required to transmit the cryptographic check value PW, which means that the load level on the vehicle data bus FDB is not increased by the provision of the cryptographic check value PW.

Additional information is preferably provided in each message MSG, for example the current time stamp T or a sequence number SEQ, as protection against unauthorized replacement of messages MSG. The cryptographic check value PW is preferably formed as a function of the payload data DAT and of the time stamp T or the sequence number SEQ. However, the cryptographic check value PW can likewise be formed only as a function of the payload data DAT.

The payload data DAT, the time stamp T as well as the sequence number SEQ and the cryptographic check value PW form a payload data part ND of the message MSG which has a length of eight bytes. By way of example, four bytes are provided for the payload data DAT for the current speed, the distance traveled or the current mileage, or the current clock time. By way of example, two bytes are provided in each case for the time stamp T and the sequence number SEQ, and for the cryptographic check value PW. A message MSG such as this can be transmitted via the vehicle data bus FDB which, for example, is in the form of a CAN. The message MSG preferably also includes an identification part ID and an acknowledgement part ACK. However, the message MSG may also have a different layout.

In a step S11, the first appliance unit GE1 receives the message MSG and checks the payload data DAT and, if applicable, the time stamp T and/or the sequence number SEQ as a function of the cryptographic check value PW, the at least one cryptographic key which has already been stored in the secure memory SMEM. By way of example, the checking process comprises once again determining the cryptographic check value PW as a function of the payload data DAT and if applicable of the time stamp T and/or the sequence number SEQ, and as a function of the at least one cryptographic key and a comparison of the newly determined cryptographic check value PW with the received cryptographic check value PW. If the two do not match, the message has been corrupted by unauthorized manipulation or by an error in transmission, and the payload data DAT contained is not trustworthy. If the cryptographic check values PW match, however, then the payload data DAT is trustworthy. It is possible to provide for the first appliance unit GE1 to acknowledge reception of the message MSG, in a step S12.

FIG. 4B shows an additionally or alternatively provided second embodiment of the secure data transmission process. The basic sequence of this process corresponds to the first embodiment. However, the payload data DAT and the associated cryptographic check value PW are sent in in each case at least one separate message MSG from the second appliance unit GE2 via the vehicle data bus FDB to the first appliance unit GE1. This is particularly advantageous when the payload data DAT and the cryptographic check value PW are too long to be transmitted jointly in one message MSG. It is also advantageous that a message content and/or layout which may already have been predetermined can be retained, and that only at least one additional message MSG, comprising the cryptographic check value PW, need be transmitted for secure transmission of the payload data DAT. The at least one message MSG which comprises the cryptographic check value PW is preferably sent within a predetermined time period after the sending of the at least one message MSG which comprises the associated payload data DAT.

Correspondingly to the secure data transmission between, for example, the tachograph DTCO and the toll onboard unit OBU via the at least one vehicle data bus FDB, secure data transmission is also carried out in a preferred manner between at least one of the appliance units in the motor vehicle and at least one external unit EE. The at least one external unit EE is formed by the external appliance unit GE or by the external transmitter/receiver or the radio beacon FB.

FIG. 6 shows a further embodiment of the system. The display instrument INST comprises the application computation unit ACPU, the data memory DMEM, the display ANZ and the at least one security device SE. The at least one security device SE in particular and preferably comprises the secure computation unit SCPU, the secure memory SMEM and the housing protective device GSE. The display instrument INST furthermore comprises a peripherals PER and interfaces IF. The interfaces IF in particular comprise the at least one data interface DS. The housing protective device GSE is preferably designed such that it also extends to the interfaces IF and to the peripherals PER, by the interfaces IF and the peripherals PER being arranged within the housing, which is protected by the housing protective device GSE, such that, although they are used as intended, they cannot be manipulated, however, without this being identified. The display instrument INST therefore comprises graduated security. At a first level, protection is provided by the housing and the housing protective device GSE, and at a second level, protection is provided by, for example, the protective grid or the protective layer of the secure memory SMEM and/or the secure computation unit SCPU.

The display instrument INST preferably has at least two data interfaces DS. In the embodiment shown in FIG. 6, the display instrument INST has three data interfaces DS. The data interfaces DS are preferably each in the form of the vehicle data bus interface. Vehicle data bus interfaces of different types can also be provided, or it is possible for at least one of the data bus interfaces DS to be provided for a different data bus type, for example as a "Universal Serial Bus" or USB for short, in particular for coupling to the external appliance EG. Other or further interfaces IF can also be provided.

The display ANZ forms a part of the peripherals PER. Furthermore, as already described above, an input unit can also be provided, which then likewise forms a part of the peripherals PER. The peripherals PER may, however, also comprise further units.

In particular, the at least one cryptographic key and/or the current mileage and/or identification information relating to the driver and/or company and/or vehicle and/or the display instrument INST and/or other appliance units and/or setting parameters for components in the vehicle for appliance units such as the convenience device control unit KST or the engine control unit MST, and/or diagnosis data relating to the vehicle exhaust gas data can be stored securely in the secure memory SMEM in the display instrument INST. In particular, manipulation-proof storage of the current mileage is of major importance, and can be carried out reliably by the display instrument INST. The provision of the at least one security device SE allows data and information such as this to be received by the display instrument INST in addition from other appliance units or from the external appliance EG via the virtual trustworthy channel, and to be checked for corruptions, and/or to be sent or passed on, secured by the respective check value PW, via the virtual trustworthy channel to other appliance units or to the external appliance EG.

Three vehicle data buses FDB or one three-part vehicle data bus FDB are or is provided in the embodiment of the system shown in FIG. 6. The tachograph DTCO is coupled to a first vehicle data bus FDB1 or first part of the vehicle data bus FDB. Appliance units, in particular controllers for the motor vehicle the engine control unit MST and/or the convenience device control unit KST, are coupled in the illustrated embodiment to a second vehicle data bus FDB2, or second part of the vehicle data bus FDB. A third vehicle data bus FDB3 or third part of the vehicle data bus FDB is provided for coupling to external appliances EG via the diagnosis interface unit DIAG, or to the toll onboard unit OBU. The tachograph DTCO and the toll onboard unit OBU are likewise equipped with the at least one security device SE, as already mentioned above. The tachograph DTCO preferably also has a printer PR.

The display instrument INST preferably forms the connecting unit VE, or the display instrument INST comprises the connecting unit VE. The display instrument INST thus has a gateway functionality. The display instrument INST can therefore pass on to at least one other of the data interfaces DS data supplied to it at one of the data interfaces DS. As a result of the at least one security device SE of the display instrument INST, the display instrument INST can very easily check the data received and possibly to be passed on, for example on the basis of the respectively attached check value PW, and/or filtering and/or authentication, in particular as a function of the at least one cryptographic key stored in the secure memory SMEM. For example, this also allows the display instrument INST to be used as a safety barrier between the vehicle data buses FDB or parts of the vehicle data bus FDB. Furthermore, the display instrument INST can also be designed to authenticate the appliance units coupled to it, that is to say to permit or to inhibit these appliance units in particular for data communication and in particular for secure data communication via the virtual trustworthy channel. This also applies in particular to external appliances EG. This allows the system to be reliably protected against possible unauthorized actions from the outside via the external appliance EG, when there is no authentication for the external appliance EG.

The display instrument INST may also have further, in particular security-relevant, functions because of the security functionality of the display instrument INST, by the provision of the at least one security device SE. By way of example, it is possible for the display instrument INST also to form the diagnosis interface unit DIAG and/or for the identification unit PID and/or the access monitoring unit KE and/or the convenience device control unit KST, or to comprise them or at least a part of them, in particular a security-relevant part. By way of example, a mechanism and/or sensor system for a door lock system and/or an immobilizing unit are/is provided in a conventional arrangement. The respectively associated and normally additionally provided appliance unit which carries out the security-relevant processing of detected sensor values and allows or rejects the opening of the vehicle door or the starting of the vehicle, that is to say in particular the identification unit PID and/or the access monitoring unit KE, can be replaced by the display instrument INST by using the at least one security device SE for security-relevant processing. This is particularly advantageous for keyless identification or access systems and/or identification or access systems with wire-free and contactless connection to a key, which key, for example, may also be formed by a smart card CK. Correspondingly, the display instrument INST can also, for example, completely or partially replace the diagnosis interface unit DIAG and/or the convenience device control unit KST and/or other appliance units. The system can cost particularly little because of the saving of additional appliance units.

The provision of the at least one security device SE in the display instrument INST furthermore makes it possible to check and/or authenticate software, in particular software updates, which are intended for the display instrument INST itself or for one of the other appliance units coupled to it, and which can be downloaded from the outside from the external appliance EG via the diagnosis interface unit DIAG. In particular, the software is software which can be executed, and can be executed in the respectively provided appliance unit in the motor vehicle. The checking and/or authentication of the software by the display instrument INST make/makes it possible to prevent unlicensed software or software which has been corrupted because of faulty transmission or unauthorized manipulation from being installed and executed, and thus adversely affecting the operation, security and reliability of the relevant appliance unit, or of the motor vehicle. Respective provision of the check value PW allows the software to be transmitted reliably and securely via the virtual trustworthy channel from the external appliance EG to the display instrument INST and, if required, from the display instrument INST further to the intended appliance unit.

Furthermore, the display instrument INST is preferably designed to receive software and in particular software which can be executed in the display instrument INST, in the form of individual programs, software functions or software functional modules, to store them, for example in the data memory DMEM, and to execute them. Software such as this makes it possible to upgrade the functionality of the display instrument INST without any need to update an operating system or firmware for the display instrument INST for this purpose. Said software is preferably executed in a protected environment or run-time environment, in such a way that other functions of the display instrument INST cannot be adversely affected. The additional software makes it possible to retrospectively retrofit display options for appliance units which will be retrospectively installed in or disconnected from the motor vehicle, that is to say display options which it has not yet been possible to consider before delivery of the display instrument INST or of the motor vehicle. This also relates in particular to appliance units from other manufacturers which in this way allow the display ANZ and/or the input unit of the display instrument INST to also be used for their respective appliance unit by downloading appropriate software into the display instrument INST, for example for the toll onboard unit OBU. In particular, the software may comprise processing and/or a display and/or provision of data and may also comprise the use of the security functionality of the display instrument INST, for example with respect to encryption, decryption, signing, checking or authentication of data. Furthermore, this also allows other appliance units, for example, to use the printer PR for the tachograph DTCO, by appropriate software in the display instrument INST handling the data communication with the tachograph DTCO, for example via the virtual trustworthy channel, and providing a printing service for other appliance units. Correspondingly, it is also possible to provide other services and thus, if required, to make components of appliance units usable for other appliance units. Furthermore, the at least one protective device SE and in particular the secure computation unit SCPU and the secure memory SMEM are preferably also used to check and/or to authenticate the software which can additionally be downloaded to the display instrument INST, corresponding to the software updates. The display instrument INST therefore forms a "trust center".

The system has an open system architecture, that is to say the system is not restricted to specific predetermined appliance units and external units EE. The provision of the cryptographic check value PW and the virtual trustworthy channel that this makes possible allows both vehicle-internal data communication between the appliance units and vehicle-external data communication with external units EE to be carried out protected against unauthorized manipulation and therefore in a trustworthy manner. Furthermore, it is also possible for the payload data DAT to be transmitted in an encrypted form, such that it remains confidential and can be decrypted only by the intended appliance unit or external unit EE. In particular, the formation of the cryptographic check value PW as a message authentication code or a shortened message authentication code RMAC allows protected, real-time-compatible data communication which complies with the requirements for data communication in vehicles.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system comprising:
a vehicle data bus;
a tachograph having a first data interface configured as a first vehicle data bus interface coupleable to the vehicle data bus;
a toll onboard unit having a second data interface configured as a second vehicle data bus interface coupleable to the vehicle data bus, the toll onboard unit and the tachograph configured as communication partners for data communication; and
a connecting unit configured to translate the data communication between the communication partners,
at least one of the tachograph and the toll onboard unit is configured as a data transmitter configured to:
determine a shortened cryptographic check value based at least in part on payload data transmitted via the data interface to the respective communication partner, and
transmit separately the payload data and the cryptographic check value associated with the payload data to the respective communication partner in respective separate messages; and
at least one of the toll onboard unit and the tachograph is configured as a data receiver to:
receive the separate messages including, respectively, the payload data and the associated cryptographic check value via the data interface from the respective communication partner in a retained layout, and
check the received payload data for corruption based at least in part on the received cryptographic check value,
whereby only the cryptographic check value transmitted in the respective separate message is required for secure transmission of the payload data,
wherein all communication partners of the tachograph are configured to authenticate themselves to the tachograph, and
wherein the tachograph is configured to produce at least one cryptographic key and to encryptedly transmit the at least one cryptographic key that is produced to only those communication partners of the tachograph that have previously authenticated themselves to the tachograph.

2. The system as claimed in claim 1, wherein the payload data transmitted from the tachograph and received by the toll onboard unit comprises at least one from the group consisting of: speed data, route data, and an up-to-date mileage, determined by at least one of the tachograph and sensors coupled to the tachograph, time data, identification data of a driver, identification data of a company, and identification data of a vehicle.

3. The system as claimed in claim 1, wherein the payload data to be transmitted from the toll onboard unit and received the tachograph comprises time at least one of information and position information from a position-finding unit.

4. The system as claimed claim 1, further comprising a display instrument as a further communication partner for data communication, which comprises:
a third data interface configured as a third vehicle data bus interface coupleable to the vehicle data bus a data interface such that the data communication takes place via the vehicle data bus, the display instrument configured to receive the payload data and the cryptographic check value associated with the payload data via the data interface from the respective communication partner, and to check the received payload data for corruption based at least in part on the received cryptographic check value.

5. The system as claimed in claim 4, wherein the display instrument is a transmitter of data configured to determine the cryptographic check value based at least in part on the payload data that is transmitted via the third data interface to the respective communication partner, and to transmit the cryptographic check value and the payload data to the respective communication partner.

6. The system as claimed in claim 4, wherein the display instrument comprises at least one secure memory configured to store at least one from the group consisting of: the at least one cryptographic key, a current mileage, identification data of a driver, identification data of a company, identification data of a vehicle, setting parameters for components in the vehicle, and diagnostics data relating to the vehicle.

7. The system as claimed in claim 4, wherein the display instrument comprises at least one housing protective device and a housing, whereby opening the housing of the display instrument can be identified.

8. The system as claimed in claim 7, wherein the housing protective device comprises a housing switch.

9. The system as claimed in claim 4, wherein the display instrument further comprises a fourth data interface configured as a fourth vehicle data bus interface coupleable to the vehicle data bus a data interface such that the data communication takes place via the vehicle data bus, the display instrument configured as the connecting unit for data communication between communication partners coupled to different ones of the third and fourth data interfaces, the display instrument further configured to perform at least one of acts from the group consisting of: relay received payload data, check the received payload data, authenticate the received payload data, and authenticate the communication partners.

10. The system as claimed in claim 9, wherein the payload data comprises one of a software, which can be executed, and forms software, which can be executed.

11. The system as claimed in claim 10, wherein the display instrument further comprises a microprocessor configured to execute the software, which can be executed.

12. The system as claimed in claim 10, wherein the display instrument is configured to relay the software, which can be executed to at least one of the communication partners after at least one of successful checking and authentication of the software, which can be executed.

13. The system as claimed in claim 4, wherein the display instrument forms at least part of at least one from the group consisting of: a convenience device control unit, a diagnosis interface unit, an identification unit configured to identify a a person, an access monitoring unit, and an immobilizer unit.

14. The system as claimed in claim 4, wherein
each of the communication partners of the tachograph comprises at least one secure memory configured to store the at least one cryptographic key, the communication partners of the tachograph are configured to receive and decrypt the at least one encrypted cryptographic key, and to secure storage of the at least one cryptographic key in their respective secure memory, and the communication partners of the tachograph are configured to determine the cryptographic check value as a function of the at least one cryptographic key.

15. The system as claimed in claim 14, wherein the communication partners of the tachograph are configured to determine the cryptographic check value as a message authentication code based at least in part on the at least one cryptographic key.

16. The system as claimed in claim 14, wherein the communication partners of the tachograph are configured to determine the cryptographic check value as a shortened message authentication code based at least in part on the at least one cryptographic key.

17. The system as claimed in claim 14, wherein the communication partners are configured to transmit the cryptographic check value with the associated payload data in one message.

18. The system as claimed in claim 14, wherein the communication partners are configured to transmit the cryptographic check value and the associated payload data separately from one another, in at least one respective message.

19. The system as claimed claim 4, wherein the toll onboard unit and the display instrument are configured to authenticate themselves with the tachograph and, in the event of successful authentication, to allow trustworthy data communication between at least one from the group consisting of:

the tachograph and at least one of the toll onboard unit and the display instrument, and the toll onboard unit and the display instrument, whereby if there is not a successful authentication, to prevent trustworthy data communication based on the check of the respectively received payload data.

20. The system as claimed in claim 4, wherein at least one of the communication partners comprises an interface to an external unit, and is configured to perform at least one from the group consisting of:

determine an external unit cryptographic check value and transmit the external unit cryptographic check value and the payload data to the external unit, and receive payload data and the cryptographic check value from the external unit and to check the received payload data for corruption based at least in part on the received cryptographic check value.

21. The system as claimed in claim 4, wherein at least one of the communication partners is configured to encrypt the payload data to be transmitted, and at least one other of the communication partners is configured to decrypt the received encrypted payload data.

22. The system as claimed in claim 4, further comprising at least one from the group consisting of:

a traffic telematics unit, an engine control unit configured to control one of an internal combustion engine and at least one electric motor, a convenience device control unit, a diagnosis interface unit, an identification unit configured to identify a person, and an access monitoring unit as communication partner for data communication, each of which comprises a respective data interface configured for the vehicle data bus interface such that the data communication takes place via the vehicle data bus, to which the at least one from the group consisting of the traffic telematics unit, the engine control unit, the convenience device control unit, the diagnosis interface unit, the identification unit and the access monitoring unit are coupled.

23. A tachograph, comprising a data interface configured as a vehicle data bus interface, such that data communication takes place with one or more communication partners via a vehicle data bus, to which the tachograph and the respective one or more communication partners are coupled, the tachograph being configured to:

receive authentication from the one or more communication partners of the tachograph, produce at least one cryptographic key and to encryptedly transmit the at least one cryptographic key that is produced to only those of the one or more communication partners that have previously authenticated themselves to the tachograph, determine a cryptographic check value as a function of payload data, for transmission via the data interface to the respective at least one communication partner, and to transmit separately the payload data and the cryptographic check value associated with the payload data to the respective communication partner in respective separate messages, and receive the respective separate messages containing the payload data and the associated cryptographic check value via the data interface in a retained layout, from the respective at least one communication partner, and to check the received payload data for corruption, based at least in part on the received cryptographic check value, whereby only the cryptographic check value in the respective separate message is required for secure reception of the payload data.

* * * * *